(12) United States Patent
Suyama et al.

(10) Patent No.: US 11,440,783 B2
(45) Date of Patent: Sep. 13, 2022

(54) DETECTION SYSTEM AND DETECTING METHOD

(71) Applicant: TOYOTA JIDOSHA KABUSHIKI KAISHA, Toyota (JP)

(72) Inventors: Kazuo Suyama, Tokyo (JP); Shinpei Murakami, Tokyo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 426 days.

(21) Appl. No.: 16/814,621

(22) Filed: Mar. 10, 2020

(65) Prior Publication Data

US 2020/0307978 A1 Oct. 1, 2020

(30) Foreign Application Priority Data

Mar. 28, 2019 (JP) ............................. JP2019-064897

(51) Int. Cl.
| | | |
|---|---|---|
| *G06F 17/00* | (2019.01) | |
| *B66F 11/04* | (2006.01) | |
| *G06V 10/25* | (2022.01) | |
| *G06V 20/10* | (2022.01) | |
| *A01G 23/00* | (2006.01) | |

(52) U.S. Cl.
CPC ............ *B66F 11/048* (2013.01); *G06V 10/25* (2022.01); *G06V 20/188* (2022.01); *A01G 23/00* (2013.01)

(58) Field of Classification Search
CPC ..... B66F 11/048; G06V 10/25; G06V 20/188; A01G 23/00; A01G 23/003; A01G 23/083; A01G 23/091; B66C 1/585; B66C 13/46; B66C 13/48; B66C 21/00; G01B 11/00; G01B 11/06; G01B 11/08; G01B 11/24; A01M 29/16; A01M 29/18
USPC ....................................................... 396/428
See application file for complete search history.

(56) References Cited

U.S. PATENT DOCUMENTS

| | | | | |
|---|---|---|---|---|
| 1,011,837 | A * | 12/1911 | O'Neill ................... | E01B 25/18 104/115 |
| 4,492,168 | A * | 1/1985 | Cellai ..................... | B61B 12/02 105/153 |
| 11,072,899 | B1 * | 7/2021 | Johnson ................. | A01G 23/08 |
| 2020/0010309 | A1 | 1/2020 | Atsumi | |
| 2020/0305361 | A1 * | 10/2020 | Suyama ............... | A01G 23/003 |
| 2020/0307978 | A1 * | 10/2020 | Suyama ................. | B66C 1/585 |
| 2022/0107253 | A1 * | 4/2022 | Suyama ................. | G01M 1/00 |

FOREIGN PATENT DOCUMENTS

| | | | | |
|---|---|---|---|---|
| CN | 106406178 A | | 2/2017 | |
| CN | 113979323 A | * | 1/2022 | |
| DE | 102020106665 A1 | * | 10/2020 | ............ B66F 11/048 |
| JP | 2002-209457 A | | 7/2002 | |

(Continued)

*Primary Examiner* — Ronnie M Mancho
(74) *Attorney, Agent, or Firm* — Oliff PLC (57) ABSTRACT

A detection system includes a plurality of support posts, cables supported by the support posts, a winding device operable to wind the cable, a lifting and lowering device that is connected to the cable, and is movable in an air when the cable is wound by the winding device, and a detecting device hung by the lifting and lowering device. The detecting device is configured to be moved by the winding device in a region defined by the support posts, and lowered by the lifting and lowering device to detect information concerning an object.

4 Claims, 11 Drawing Sheets

(56) References Cited

FOREIGN PATENT DOCUMENTS

| | | | |
|---|---|---|---|
| JP | 3162428 U | | 9/2010 |
| JP | 2013-088188 A | | 5/2013 |
| JP | 2015-139391 A | | 8/2015 |
| JP | 2018-084472 A | | 5/2018 |
| SU | 624804 A | * | 8/1978 |
| WO | 2018/174101 A1 | | 9/2018 |

* cited by examiner

| TREE ID | POSITION INFORMATION | DIAMETER INFORMATION | TREE HEIGHT | CURVE INFORMATION |

DETECTION SYSTEM AND DETECTING METHOD

INCORPORATION BY REFERENCE

The disclosure of Japanese Patent Application No. 2019-064897 filed on Mar. 28, 2019 including the specification, drawings and abstract is incorporated herein by reference in its entirety.

BACKGROUND

1. Technical Field

The disclosure relates to a detection system using cables, and a detecting method.

2. Description of Related Art

A form survey method for measuring a form of a three-dimensional measurement object by use of a laser scanning device is disclosed in Japanese Unexamined Patent Application Publication No. 2013-88188 (JP 2013-88188 A). According to the form survey method, when the laser scanning device irradiates a survey range with laser light, each point of a large number of reflection points of the laser light is obtained as a point on a three-dimensional coordinate system, and a large number of grids are created on a horizontal plane of the survey range. Then, low-level points having the lowest altitude value are extracted from vertical coordinate distributions of a group of points in each grid, and a terrain model of the survey range is created, using the low-level points extracted in each grid.

SUMMARY

When a detecting device is used for detecting an object, the detecting device is initially moved to a location close to the object. However, it may be difficult to move the detecting device to the location close to the object, depending on the location.

The disclosure provides a technology that makes it easy to move a detecting device to a position at which an object can be detected.

A detection system according to a first aspect of the disclosure includes a plurality of support posts, a cable supported by the support posts, a winding device operable to wind the cable, a lifting and lowering device that is connected to the cable, and is movable in the air when the cable is wound by the winding device, and a detecting device hung by the lifting and lowering device. The detecting device is configured to be moved by the winding device in a region defined by the support posts, and configured to be lowered by the lifting and lowering device to detect information concerning an object.

A detecting method using a detection system including a winding device operable to wind a cable supported by support posts, a lifting and lowering device that is connected to the cable, and is movable in the air when the cable is wound by the winding device, and a detecting device hung by the lifting and lowering device, is provided according to a second aspect of the disclosure. The detecting method includes a first step of moving the lifting and lowering device connected to the cable, to a point above a detection point, by causing the winding device to wind the cable, a second step of lowering the detecting device by the lifting and lowering device, a third step of detecting information concerning an object, by the detecting device, and a fourth step of lifting the detecting device by the lifting and lowering device. The first step through the fourth step are repeated at another detection point.

According to the disclosure, it is possible to provide the technology that makes it easy to move the detecting device to the position at which the object can be detected.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
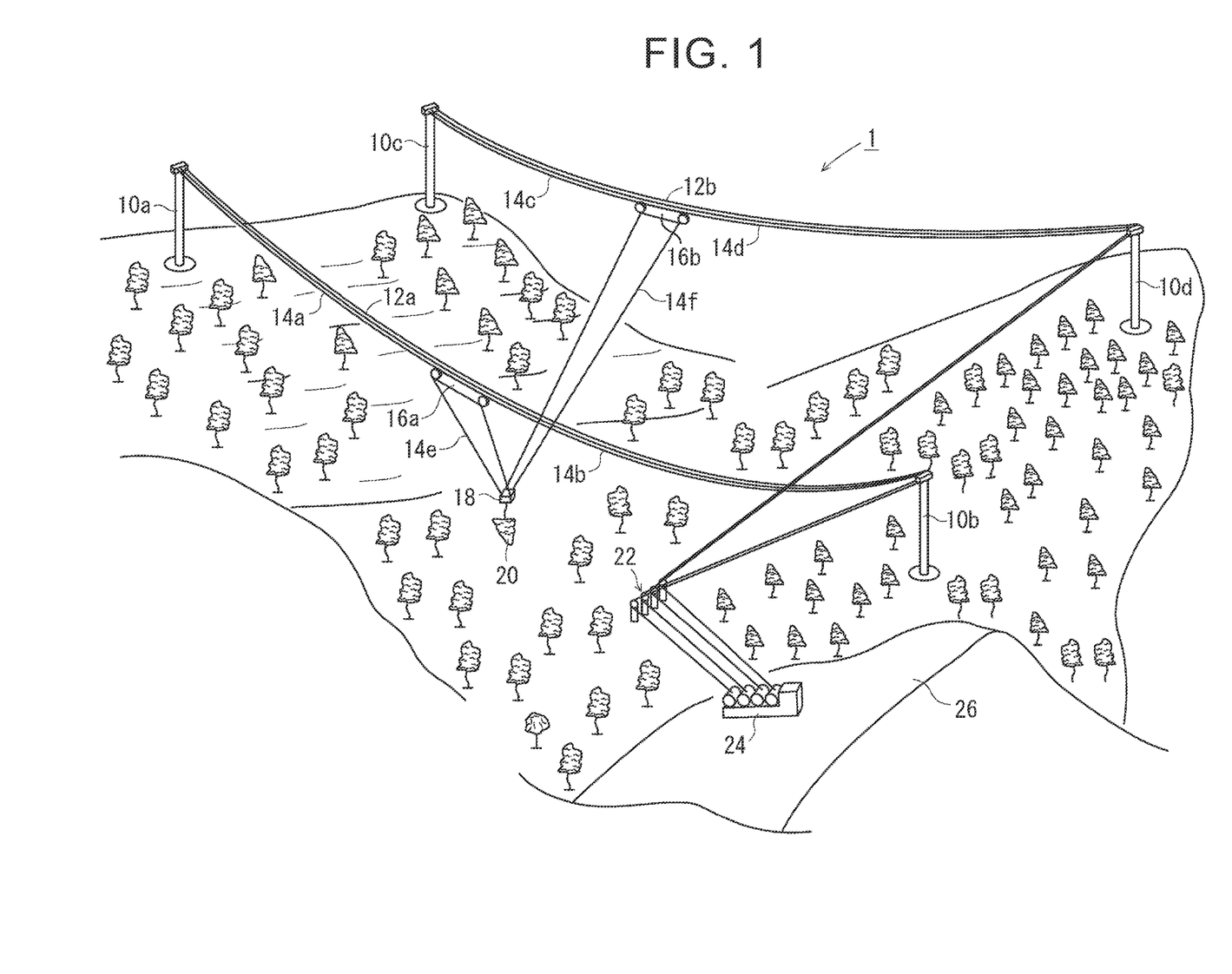
FIG. 1 is a view useful for describing a cable use system.

FIG. 1 is a view useful for describing a cable use system 1. The cable use system 1 includes a first support post 10*a*, second support post 10*b*, third support post 10*c*, fourth support post 10*d* (each of which will be called "support post 10" when they are not distinguished from one another), first main cable 12*a*, second main cable 12*b* (each of which will be called "main cable 12" when they are not distinguished from each other), first operation cable 14a, second operation cable 14b, third operation cable 14c, fourth operation cable 14d, fifth operation cable 14e, sixth operation cable 14f (each of which will be called "operation cable 14" when they are not distinguished from one another), first moving device 16a, second moving device 16b (each of which will be called "moving device 16" when they are not distinguished from each other), holding device 18, guide pulleys 22, and winches 24.

The cable use system 1 is a so-called H-shaped cable use system, and is used for lifting a tree 20 felled in a forest, with the main cables 12 and operation cables 14 hung in the air, and conveying the tree 20 to a collection place 26 or its vicinity. In this manner, it is possible to convey trees 20 from the forest, without constructing roads.

The four support posts 10 are erected at positions that are suitable for installation and determined based on the arrangement of standing trees and the position of the collection place 26. The size of each support post 10 is set to about 5 meters to 10 meters, depending on the size of the cable use system 1, for example.

The main cables 12 and operation cables 14 are fixed as cables to the support posts 10, or are wrapped around pulleys of the support posts 10. The first main cable 12a is fixed to the first support post 10a and the second support post 10b, and the second main cable 12b is fixed to the third support post 10c and the fourth support post 10d. The first main cable 12a and second main cable 12b, which function as rails in the air, are installed so as not to intersect with each other. The length of each main cable 12 is about 300 meters to 1500 meters.

The operation cables 14 function as moving cables that are wound by the moving devices 16 or winches 24. The first operation cable 14a, second operation cable 14b, third operation cable 14c, and fourth operation cable 14d engage with the pulleys provided on the support posts 10, and one end of each operation cable 14 is connected to the corresponding moving device 16, while the other end is connected to the corresponding winch 24. The first operation cable 14a is connected from the winch 24 to the first moving device 16a via the second support post 10b and the first support post 10a. The second operation cable 14b is connected from the winch 24 to the first moving device 16a via the second support post 10b. The third operation cable 14c is connected from the winch 24 to the second moving device 16b via the fourth support post 10d and the third support post 10c. The fourth operation cable 14d is connected from the winch 24 to the second moving device 16b via the fourth support post 10d. The fifth operation cable 14e and sixth operation cable 14f are connected to the moving devices 16 and the holding device 18.

The first moving device 16a and second moving device 16b are supported by the first main cable 12a and second main cable 12b, respectively, and are movable along the first main cable 12a and second main cable 12b. The first operation cable 14a, second operation cable 14b, and fifth operation cable 14e are connected to the first moving device 16a, and the third operation cable 14c, fourth operation cable 14d, and sixth operation cable 14f are connected to the second moving device 16b. The fifth operation cable 14e connects the first moving device 16a with the holding device 18, and the sixth operation cable 14f connects the second moving device 16b with the holding device 18. The moving devices 16 function to hoist and lower the fifth operation cable 14e and the sixth operation cable 14f, according to command signals wirelessly transmitted thereto.

The holding device 18 has a wire for lifting and lowering, and a hook provided at a distal end of the wire for lifting and lowering. The holding device 18 grasps the tree 20 with the hook. The holding device 18 moves the hook up and down while winding or unwinding the wire, when it grasps the tree 20 and when it lowers the tree 20.

The guide pulleys 22 change the directions of the operation cables 14 that engage with the guide pulleys 22. The winches 24 function to wind the operation cables 14, respectively, and have drums and drive sources for winding or unwinding the respective operation cables 14.

Operation of the cable use system 1 will be described. The winches 24 wind one of the first operation cable 14a and the second operation cable 14b and unwind the other, so as to move the first moving device 16a along the first main cable 12a. Also, the winches 24 wind one of the third operation cable 14c and the fourth operation cable 14d and unwind the other, so as to move the second moving device 16b along the second main cable 12b. As a result, the holding device 18 is displaced along the main cables 12.

When the moving devices 16 wind one of the fifth operation cable 14e and the sixth operation cable 14f and unwind the other, the holding device 18 moves between the first moving device 16a and the second moving device 16b. Thus, the holding device 18 moves in substantially horizontal directions, within a region surrounded by the four support posts 10, so as to convey the tree 20 felled within the region.

While the cable use system 1 is used for collecting trees in the embodiment of FIG. 1, the disclosure is not limited to this embodiment, but the holding device 18 of the cable use system 1 may be replaced with another device, so that the system 1 can find various applications. For example, a detecting device may be provided in place of the holding device 18, for obtaining data on trees. Also, a logging device may be provided in place of the holding device 18, for logging trees under automatic control or remote control. Also, an animal damage control device may be provided in place of the holding device 18, for repelling harmful animals.

Detection System for Detecting Trees

Figure 2:
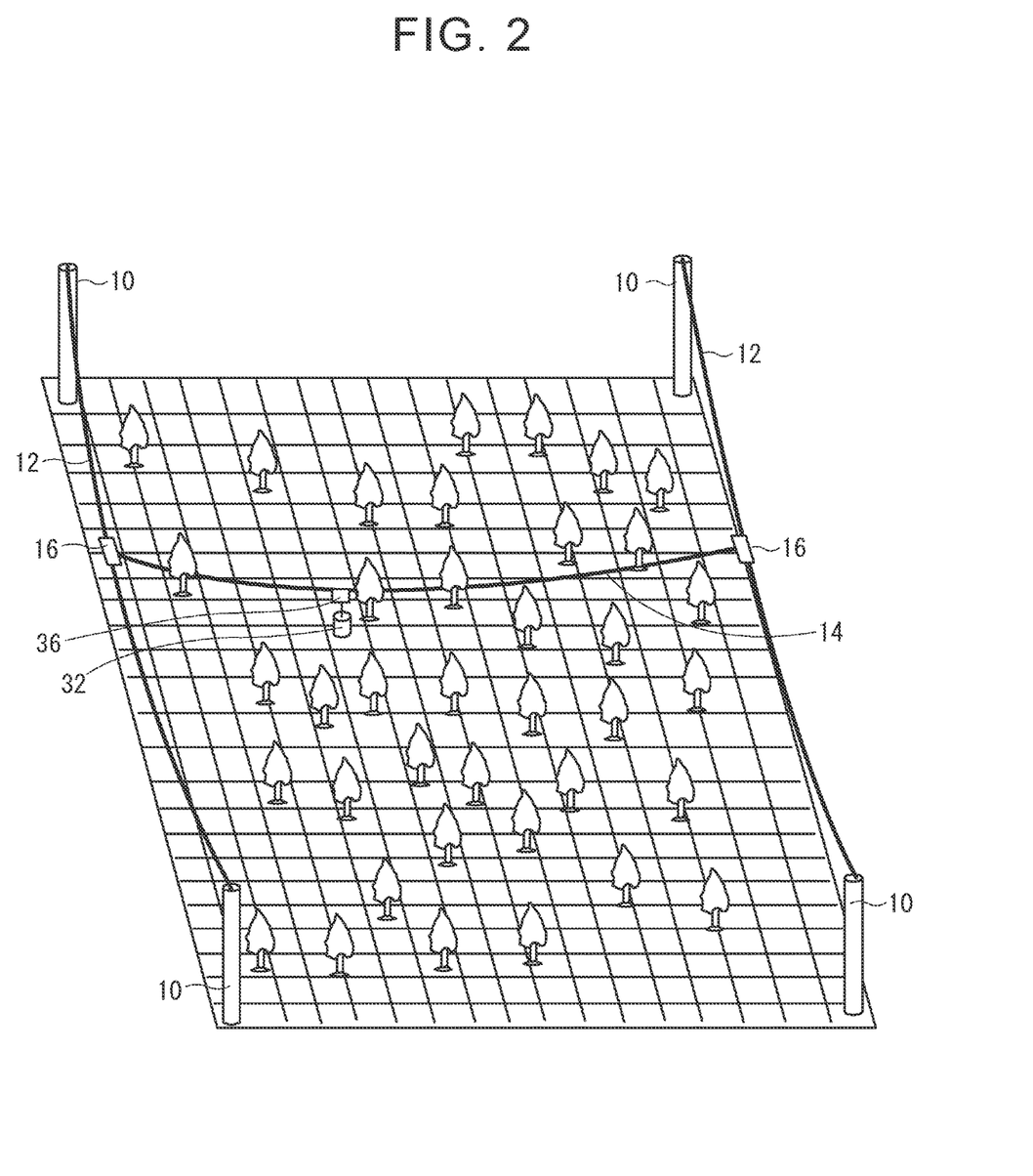
FIG. 2 is a view useful for describing a detection system using the cable use system.

FIG. 2 is a view useful for describing a detection system using the cable use system 1. The detection system shown in FIG. 2 is different from the cable use system 1 shown in FIG. 1, in that the system has a detecting device 32 and a lifting and lowering device 36, in place of the holding device 18. The detection system of FIG. 2 detects trees so as to generate tree information of a forest. The tree information is used for selection of trees subjected to thinning, and resource management.

The lifting and lowering device 36 is connected to a pair of operation cables 14, and is located between a pair of main cables 12, so as to hang the detecting device 32. The detecting device 32 moves along with the lifting and lowering device 36, within a region defined by a plurality of support posts 10, and obtains detection data by irradiating trees present in the region with laser light, or capturing images of the trees. The trees included in the detection data are subjected to analytical processing, so that tree information is generated and recorded.

While the cable use system 1 has four support posts 10 in the example of FIG. 2, the system 1 is not limited to this arrangement, but the number of the support posts 10 may be two or three, for example. Also, while the H-shaped cable use system 1 is illustrated in FIG. 2, the shape of the system 1 is not limited to the H-shape. When the cable use system 1 has two support posts 10, a region defined by the support posts 10 is in the form of a straight line.

Figure 3:
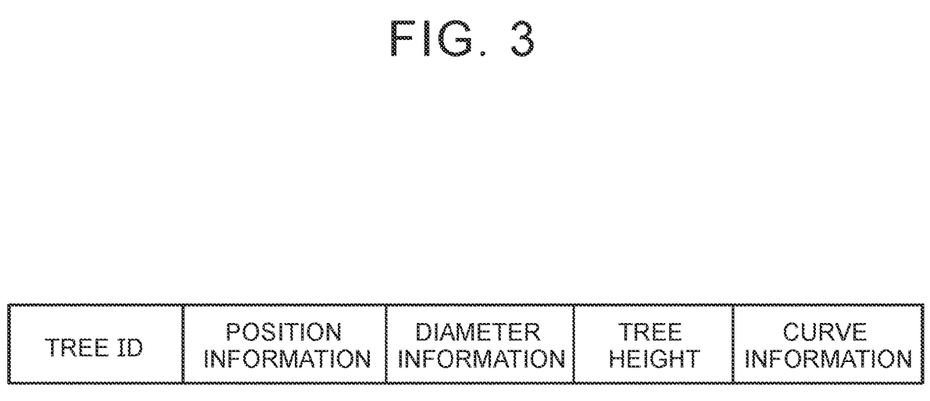
FIG. 3 is a view showing tree information obtained by the detection system.

FIG. 3 shows tree information obtained by the detection system. The tree information includes a tree ID, position information, diameter information, tree height, and curve information, with respect to each tree. The position information is obtained, based on the detection position of the detecting device 32 and the positional relationship between the detecting device 32 and the tree concerned. The diameter information indicates diameters of the tree at different levels from the root to near the treetop, and the thinness of the tree can be grasped from the diameter information. The curve information indicates the degree of curve of the tree.

The positional relationship among trees is grasped from the position information of the tree information, and the volume of each tree is grasped from the diameter information and the tree height. The positional relationship among the trees is used for selection of trees subjected to thinning. The volume and curve information of each tree may be used for calculation to determine what kind of timber can be produced from the tree, and may be used for resource management and selection of trees to be logged. With the tree information on a forest provided, it is possible to grasp timbers that can be produced from the forest, and easily determine trees to be logged when an order for timbers is received.

The diameter information and curve information cannot be derived from data of trees detected from above the trees, since the trunks of the trees cannot be detected due to the presence of branches and leaves of the trees. Thus, the detecting device 32 is lowered through between the trees, and detects the trees on the root side.

Figure 4:
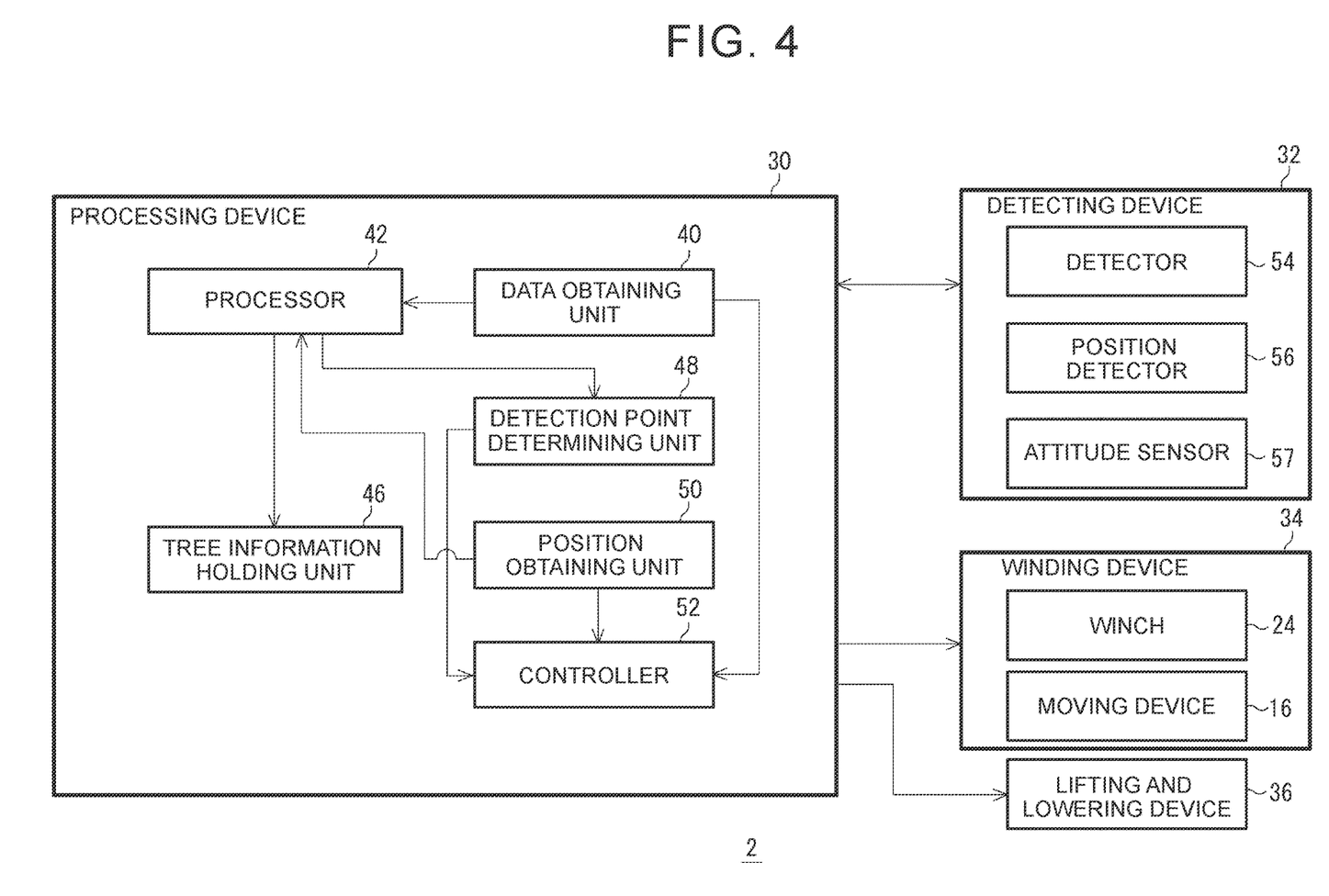
FIG. 4 is a view showing the functional configuration of the detection system.

FIG. 4 shows the functional configuration of the detection system 2. The detection system 2 includes a processing device 30, detecting device 32, winding device 34, and lifting and lowering device 36. The processing device 30 is wirelessly connected to the detecting device 32, winding device 34, and lifting and lowering device 36, and is able to control each of these devices.

The detecting device 32 has a detector 54, position detector 56, and attitude sensor 57. The detector 54, which is a three-dimensional laser scanner and/or an imaging camera, detects information concerning a tree or trees, and obtains the time of detection thereof. The three-dimensional laser scanner and imaging camera may consist of two or more sensors, such that trees present in all directions can be detected from the detecting device 32. For example, the imaging camera is able to capture images in three different directions that vary 120 degrees at the same time, and the images captured in the three directions are combined, so that trees in all directions can be detected.

The position detector 56 detects position information and detection time, using the Global Positioning System (GPS). The detection results of the detector 54 and the position information of the position detector 56 are associated with each other, via the detection time. The position of each tree is specified by the position information. The detecting device 32 may be provided at its lower end with a leg portion that is brought into contact with the ground at the time of detection. The leg portion may have one rod-like leg or two or more rod-like legs, and protrudes downward of the detecting device 32. With the leg portion thus provided, the attitude of the detecting device 32 can be stabilized. Also, the leg portion may be provided with a pressure sensor used for determining whether the detecting device 32 has been seated on the ground. The lifting and lowering device 36 may stop lowering the detecting device 32, using the result of detection of seating on the ground by the pressure sensor, as a trigger.

The attitude sensor 57 includes an acceleration sensor and a gyroscope sensor, and detects the attitude of the detecting device 32. The result of detection of the attitude sensor 57 is used for correcting the result of detection of the detector 54 when the detecting device 32 swings. Also, the detector 54 may stop measuring, while the attitude sensor 57 senses that the detecting device 32 is swinging with an amplitude of a predetermined value or more.

The winding device 34 has the winches 24 and moving devices 16 shown in FIG. 1. The winding device 34 winds the operation cables 14, so as to make the detecting device 32 and the lifting and lowering device 36 movable in substantially horizontal directions. In the arrangement of the cable use system 1 shown in FIG. 1, the moving devices 16 that wind the fifth operation cable 14e and sixth operation cable 14f are connected to the main cables 12; however, the disclosure is not limited to this arrangement, but the fifth operation cable 14e and sixth operation cable 14f may be extended to the position of the winches 24, so that the winding function of the moving devices 16 can be integrated with that of the winches 24. Thus, the winding device 34 may have an integral structure, or may consist of separate bodies.

The lifting and lowering device 36 wirelessly receives a command signal from the processing device 30, and lifts or lowers the detecting device 32 that is hung from the lifting and lowering device 36 with a hoisting wire. The lifting and lowering device 36 may have a camera for monitoring conditions of the detecting device 32.

The processing device 30 has a data obtaining unit 40, processor 42, tree information holding unit 46, detection point determining unit 48, position obtaining unit 50, and controller 52. The data obtaining unit 40 obtains detection data of the detector 54, more specifically, measurement results of the laser scanner, and/or captured images. The position obtaining unit 50 obtains the position information detected by the position detector 56, and the time of detection thereof.

The processor 42 performs analytical processing on the detection data obtained by the data obtaining unit 40. The processor 42 performs a position deriving process to derive positions of trees present in the region defined by the support posts 10, and a tree analyzing process to generate tree information.

In the position deriving process, detection data of the detector 54 that detects information concerning trees, in a condition where the detecting device 32 is lifted above the trees, and position information of the detecting device 32 at the time of detection, are used. In a large-sized cable use system 1 in which the length of the main cables 12 is about 1500 meters, the detecting device 32 may obtain detection data a plurality of times while changing its position. It is also possible to detect information concerning trees, from the air, using a detecting device installed on an unmanned aircraft, aside from the detecting device 32, and use the detection data in the position deriving process. The processor 42 derives the tip positions of the trees included in the detection data of the detector 54 and the positional relationship of the detecting device 32 with the trees, based on the detection data and the position information at the time of detection, and derives position information on a plurality of trees.

The detection point determining unit 48 determines detection points at which the detecting device 32 is lowered to the root side of trees, based on the position information of the trees estimated by the processor 42. Each detection point is determined to be an open place between adjacent trees, where there are no tree tips, and determined to be a location where the detecting device 32 is less likely or unlikely to be caught in branches and leaves, and the detection point determining unit 48 produces detection point information as a plurality of pieces of position information. The detection point information may be the same coordinate information as the position information obtained from the lifting and lowering device 36. Thus, by detecting tips of trees from above the trees, and setting positions between the trees as detection points, it is possible to reduce the possibility that the detecting device 32 is caught in branches and leaves when it is lowered at the detection points.

The controller 52 controls the winding device 34 and the lifting and lowering device 36 so that the detecting device 32 can detect a tree or trees at each detection point determined by the detection point determining unit 48. The controller 52 controls driving of the winding device 34 while monitoring the position information of the detecting device 32, based on the detection point information determined by the detection point determining unit 48, so as to move the detecting device 32 and lifting and lowering device 36 in substantially horizontal directions and stop the winding device 34 at the detection point. Then, the controller 52 controls driving of the lifting and lowering device 36 at the detection point, so as to lower the detecting device 32 to the root side of the tree. Then, the controller 52 drives the detector 54 to detect information concerning the tree. Once the detector 54 finishes obtaining detection data, the controller 52 controls driving of the lifting and lowering device 36, so as to lift the detecting device 32 to a position higher than the trees, and completes detection control at one point.

Then, the controller 52 controls driving of the winding device 34, and moves the detecting device 32 to another detection point, for detection at the detection point. The controller 52 repeatedly moves the detecting device 32 in substantially horizontal directions and lower and lift the detecting device 32, so as to perform detection control at all of the detection points determined by the detection point determining unit 48. Thus, it is possible to reduce the possibility that the detecting device 32 is caught in branches and leaves of trees when the detecting device 32 is moved in substantially horizontal directions.

The controller 52 may control the lifting and lowering device 36 so as to lower the detecting device 32 while avoiding branches and leaves of trees, based on captured images of the detector 54, after the detecting device 32 reaches each detection point. Also, the position at which the detecting device 32 is lowered may be adjusted through operation of the winding device 34 by the operator.

Also, the controller 52 may monitor movement of the detecting device 32 based on the result of detection of the attitude sensor 57, and may stop detection with the detector 54 when the amount of movement of the detecting device 32 is equal to or larger than a predetermined value.

Returning to processing of the processor 42, detection data obtained by the detector 54 as information concerning the root side of each tree is used in the tree analyzing process. Two or more pieces of detection data detected by the detector 54 at different levels may be used as the detection data.

The processor 42 derives the diameter information, tree height, and curve information, based on the detection data. The processor 42 also derives the positional relationship between the detector 54 and the tree concerned, based on the detection data of the detector 54, and derives the position information of the tree, based on the detection data of the detector 54 and the position information at the time of detection. The processor 42 may correct measurement data of the laser scanner, based on the result of detection of the attitude sensor 57. The processor 42 generates tree information as shown in FIG. 3, based on the result of analysis, and stores the tree information in the tree information holding unit 46.

Figure 5:
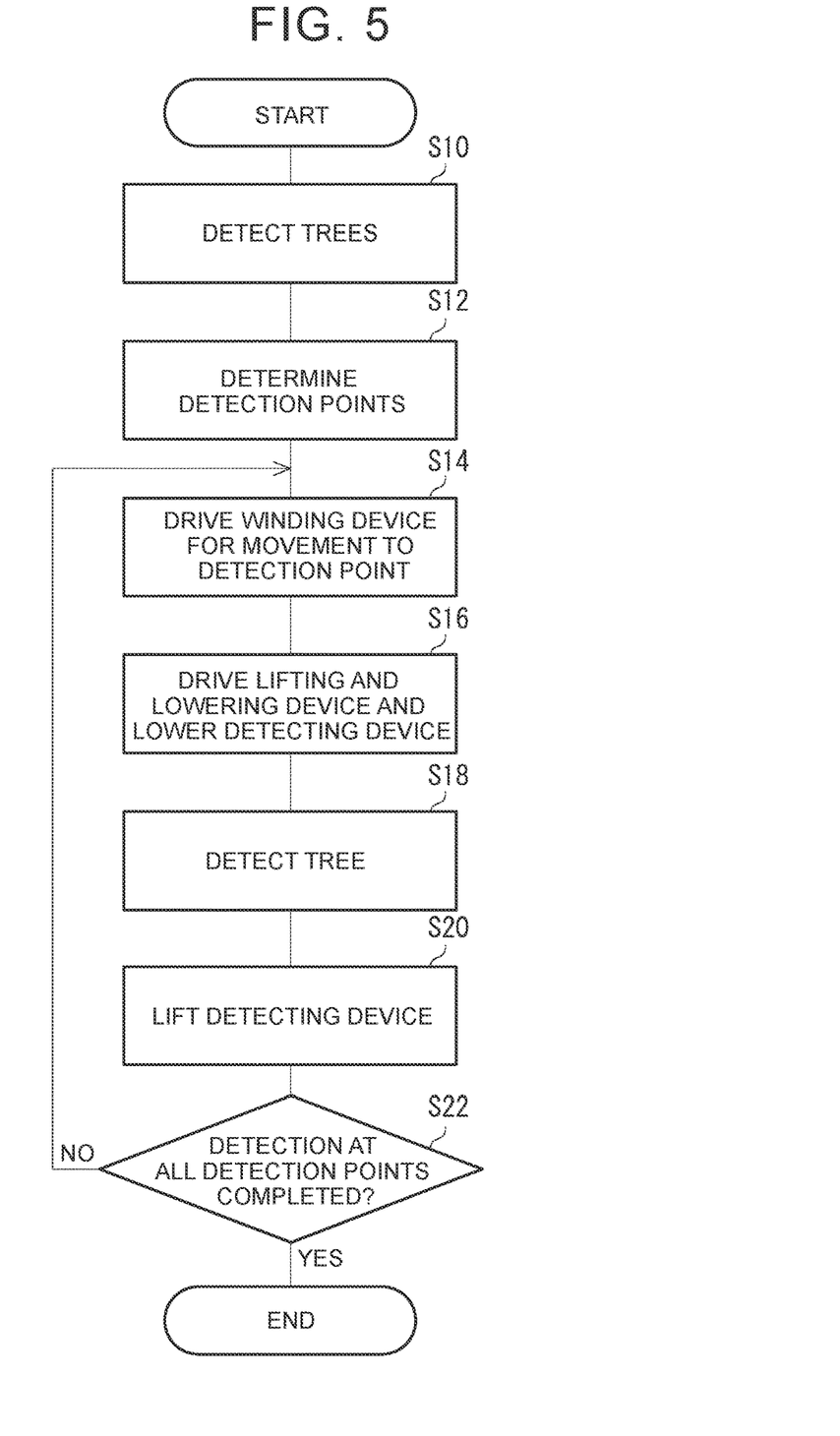
FIG. 5 is a flowchart of a process of detecting trees.

FIG. 5 is a flowchart of a process of detecting trees. The detector 54 detects information concerning trees present in a region defined by a plurality of support posts 10 as seen from above the trees (S10). The data obtaining unit 40 obtains detection data from the air above the trees, from the detecting device 32. The processor 42 derives tip positions of the trees based on the detection data and the position information of the detector 54 at the time of detection, and the detection point determining unit 48 determines detection points at positions among the trees (S12).

The controller 52 controls driving of the winding device 34 based on one of the detection points thus determined, and moves the detecting device 32 and the lifting and lowering device 36 to the detection point (S14). The controller 52 controls driving of the lifting and lowering device 36 at the detection point, so as to lower the detecting device 32 to the root side of the tree (S16).

The detector 54 detects information concerning the tree including the root of the tree, based on a command signal from the controller 52 (S18). The detecting device 32 may also detect information while it is being lifted or lowered by the lifting and lowering device 36. The controller 52 controls driving of the lifting and lowering device 36, and lifts the detecting device 32 above the trees (S20).

The controller 52 determines whether detection of the trees is completed at all of the detection points (S22). When detection of the trees has not been completed at all of the detection points (NO in S22), the controller 52 repeats control of steps S14 to S20. When detection of the trees is completed at all of the detection points (YES in S22), the controller 52 finishes this process. After detecting the detection data of the trees, the processing device 30 performs a process of generating the tree information.

The detection system 2 may be used for the purposes other than detection of trees, for example, may be used in biological survey on animals in a forest. In this case, objects to be detected are animals and nests or dens, and the detection system 2 may go around and detect nests or dens provided in a plurality of trees.

Logging System for Logging Trees

The cable use system 1 may be used as a logging system for logging trees. In the logging system, a logging device capable of gripping a tree is mounted, in place of the detecting device 32 shown in FIG. 2, so as to achieve both logging and conveyance of the tree.

Figure 6:
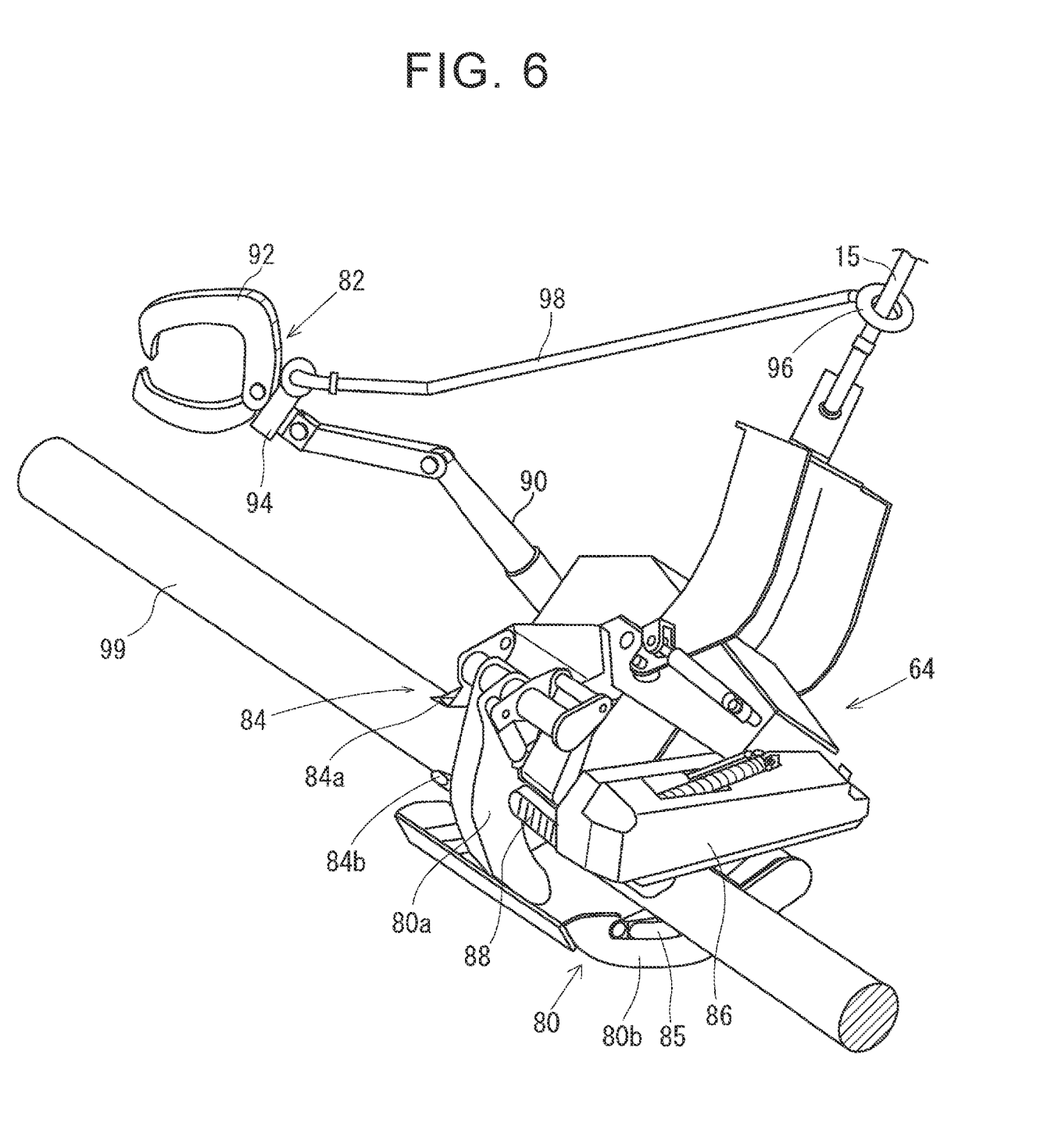
FIG. 6 is a perspective view of a logging device in a condition where it grips a tree.
Figure 7:
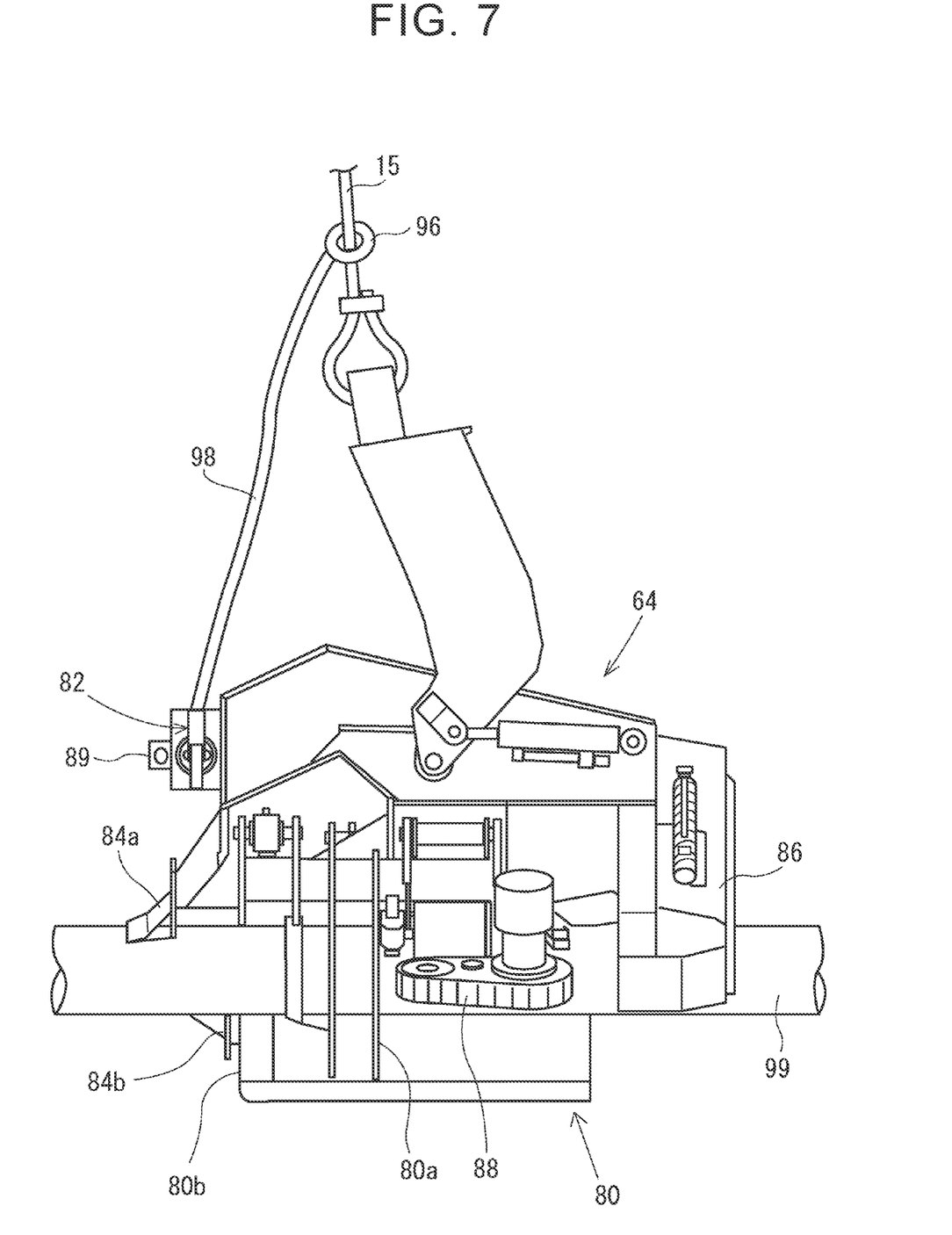
FIG. 7 is a front view of the logging device in the condition where it grips the tree.

FIG. 6 is a perspective view of a logging device 64 in a condition where it grips a tree 99. FIG. 7 is a front view of the logging device 64 in a condition where it grips the tree 99. The logging device 64 is mounted in a condition where it is hung from the lifting and lowering device 36 shown in FIG. 2, and can wirelessly receive a command signal. The logging device 64 is hung from the lifting and lowering device 36 with a hoisting wire 15, and moves up and down when the lifting and lowering device 36 winds and unwinds the hoisting wire 15. The logging device 64 has a gripping portion 80, manipulator 82, limbing portion 84, cutting portion 86, feeding portion 88, and camera 89.

The gripping portion 80 is able to grip a tree, and has a pair of gripping bodies 80*a*, 80*b*. The gripping bodies 80*a*, 80*b* are formed in generally arc-like shape, as seen in a plane perpendicular to the longitudinal direction of the tree 99, and are pivotally mounted. The gripping portion 80 grips the tree 99 when the gripping bodies 80a, 80b are rotated such that their distal ends come close to each other, and releases gripping when the gripping bodies 80a, 80b are rotated such that their distal ends move away from each other. The gripping bodies 80a, 80b have rollers 85 at their portions that contact with the tree 99, namely, on the radially inner sides of the gripping bodies 80a, 80b as seen in the above plane. The roller 85 has a rotational axis extending in a direction perpendicular to the longitudinal direction of the tree 99, and is adapted to rotate when the tree 99 moves in the longitudinal direction, so as to allow the tree 99 to move in the longitudinal direction while the gripping portion 80 is gripping the tree 99. The gripping portion 80 can grip the tree 99 with force of one of two different levels, i.e., a weak gripping state and a strong gripping state. The roller 85 is able to rotate in the weak gripping state, and may be inhibited from rotating in the strong gripping state.

The feeding portion 88 is provided on each of the gripping bodies 80a, 80b, and is adapted to be driven to rotate like a belt conveyor. The feeding portion 88 is pressed against a surface of the tree 99 when it is weakly gripped, and feeds the tree 99 in the longitudinal direction when driven. With the feeding portions 88 thus provided, the logging device 64 gripping the tree 99 can be moved along the tree 99. The feeding portion 88 may have a stopper, and may be arranged not to rotate when the tree 99 is gripped and conveyed.

The limbing portion 84 has two or more cutters 84a, 84b provided on the gripping bodies 80a, 80b, respectively, and is able to limb the tree 99. The cutters 84a, 84b are located so as to surround the tree 99 and are pressed against the surface of the tree 99 when the tree 99 is in a gripped state. When the feeding portions 88 are driven to move the logging device 64 along the tree 99, the cutters 84a, 84b cut or scrape off the bark and branches of the tree.

The cutting portion 86 is provided on a side face of the gripping portion 80, and is operable to cut the tree 99 when it is in a gripped state. The cutting portion 86 functions as a chain saw, and cuts off the tree 99 when its cutting part rotates toward the tree 99. The cutting portion 86 is located on the lower side of the logging device 64 when the tree 99 is in the gripped state.

The manipulator 82 has a function to seize the tree 99 and make the logging device 64 closer to the tree 99, and a function to support the hoisting wire 15 at the upper part of the tree 99. The manipulator 82 has an arm portion 90, hook portion 92, detachable portion 94, ring portion 96, and connecting wire 98.

The arm portion 90 is driven like a robot arm, and makes the hook portion 92 closer to the tree 99 when it extends. The hook portion 92 can rotate so as to be opened, and is able to seize the tree 99 when it moves like a human hand.

The detachable portion 94 can be attached to and detached from the arm portion 90, and is detached from the arm portion 90 in response to a control signal, so as to separate the hook portion 92 from the arm portion 90. The ring portion 96, through which the hoisting wire 15 is inserted, can move along the hoisting wire 15 while being engaged with the hoisting wire 15. The connecting wire 98 connects the hook portion 92 with the hoisting wire 15 via the ring portion 96.

Figure 8A:
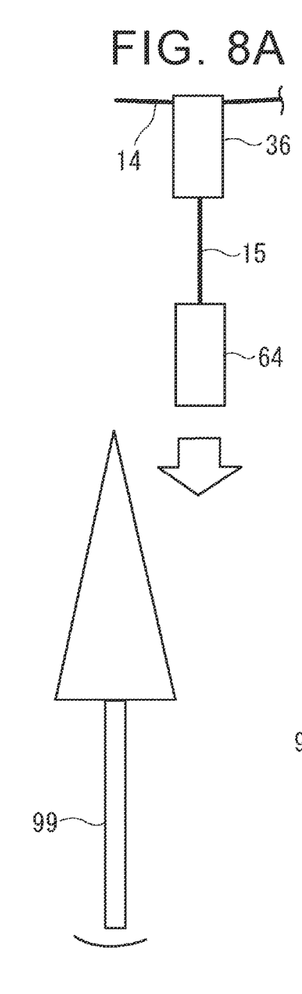
FIG. 8A is a view showing the flow of operation to cause the logging device to grip a tree.

FIG. 8A to FIG. 8D show the flow of operation to have the tree gripped by the logging device 64. As shown in FIG. 8A, the lifting and lowering device 36 and the logging device 64 move to a point above the tree 99 that is scheduled to be logged, through winding of the operation cables 14 by the winding device 34. The logging device 64 is hung from the lifting and lowering device 36 with the hoisting wire 15.

Figure 8B:
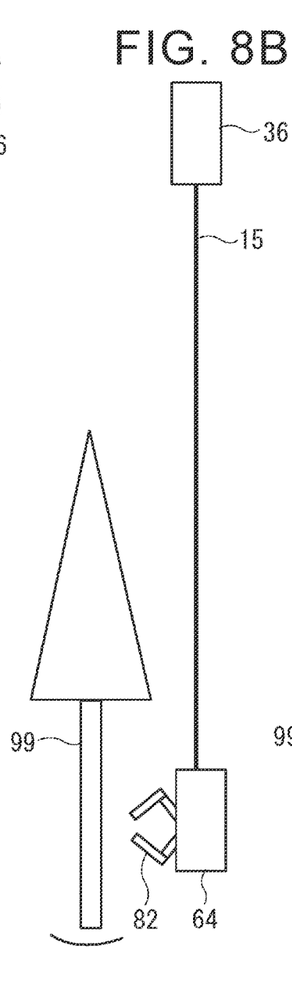
FIG. 8B is a view showing the flow of operation to cause the logging device to grip the tree.
Figure 8C:
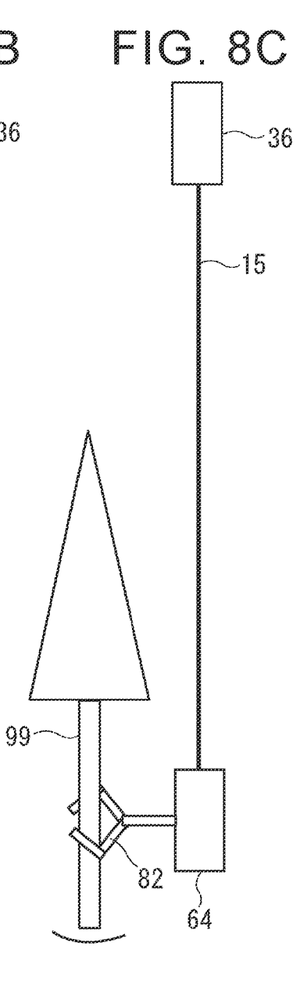
FIG. 8C is a view showing the flow of operation to cause the logging device to grip the tree.

In FIG. 8B, the lifting and lowering device 36 unwinds the hoisting wire 15, and lowers the logging device 64 down to the vicinity of the root of the tree 99. As a result, the logging device 64 is located at around a portion of the tree 99 having no branches. The manipulator 82 extends the arm portion 90, and causes the hook portion 92 to seize the trunk of the tree 99 as shown in FIG. 8C. At this time, the position of the trunk may be checked with the camera 89, and the arm portion 90 may be operated.

Figure 8D:
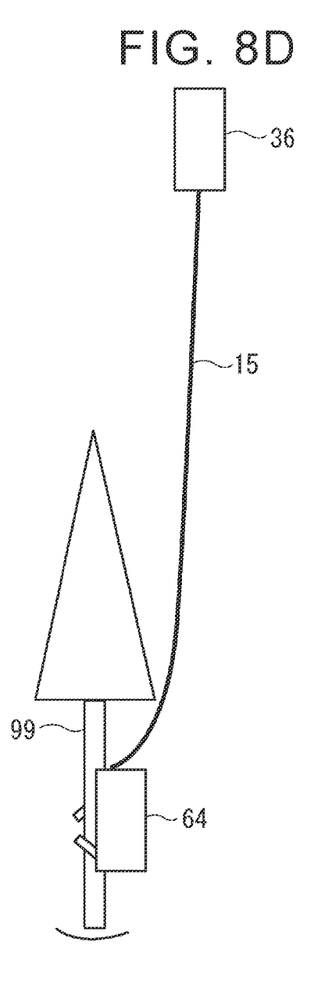
FIG. 8D is a view showing the flow of operation to cause the logging device to grip the tree.

After the hook portion 92 of the manipulator 82 seizes the tree 99, the arm portion 90 is shortened, so that the logging device 64 comes close to the trunk of the tree 99, and the gripping portion 80 of the logging device 64 grips the tree 99, as shown in FIG. 8D. While the logging device 64 is in an unstable condition where it is hung from the lifting and lowering device 36, the manipulator 82 enables the logging device 64 to come close to the tree 99, so that the tree 99 can be easily gripped.

Figures 9A, 9B:
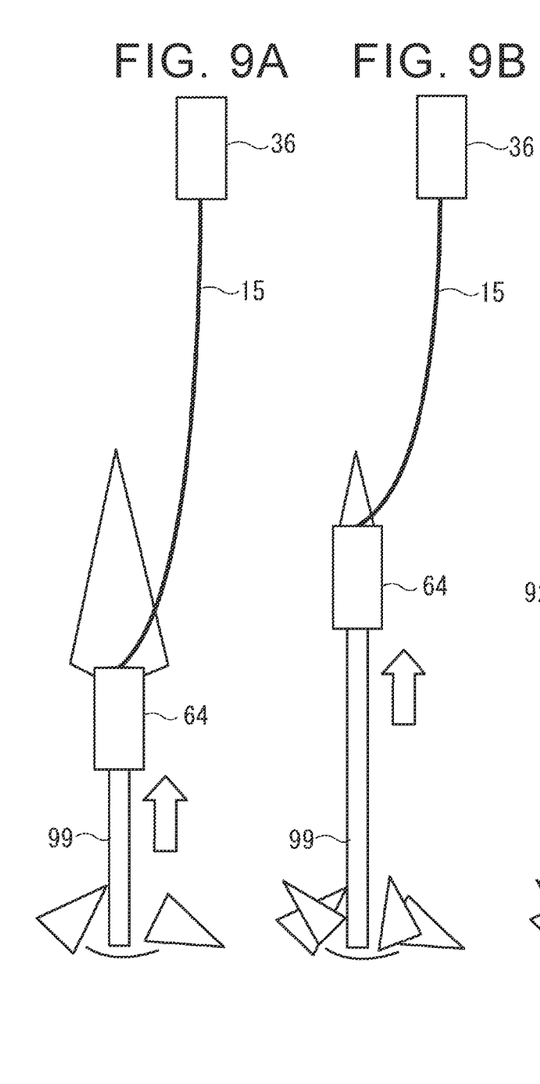
FIG. 9A is a view showing the flow of limbing and logging performed by the logging device.
FIG. 9B is a view showing the flow of limbing and logging performed by the logging device.

FIG. 9A to FIG. 9E show the flow of operation to limb and log the tree with the logging device 64. After the gripping portion 80 of the logging device 64 grips the trunk of the tree 99, the gripping portion 80 is brought into a weak gripping state, and the feeding portions 88 are driven, so as to move the logging device 64 upward along the tree 99, while limbing the tree 99, as shown in FIG. 9A. In FIG. 9B, the logging device 64 is moved to the upper part of the tree 99, and limbing operation is completed.

Figure 9C:
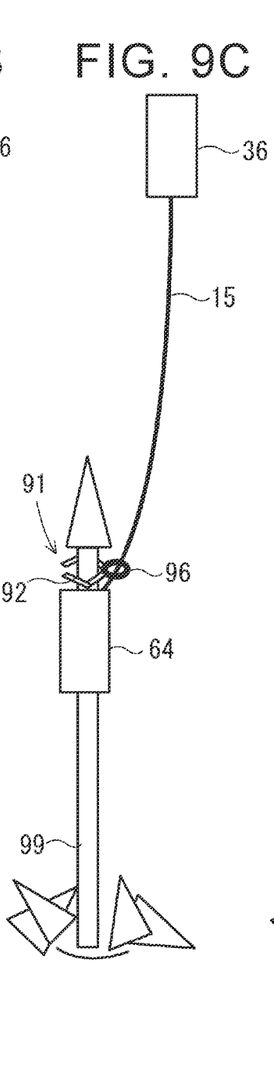
FIG. 9C is a view showing the flow of limbing and logging performed by the logging device.

As shown in FIG. 9C, the hook portion 92 of the manipulator 82 seizes the upper part of the tree 99, and the detachable portion 94 is detached from the arm portion 90, so that the hook portion 92 is fixed to the upper part of the tree 99 while being connected with the hoisting wire 15 via the ring portion 96. The hook portion 92 and the ring portion 96, through which the hoisting wire 15 is inserted, function as a fixed member 91 that is fixed to the upper part of the tree 99. The fixed member 91 is fixed to the upper part of the tree 99 when the feeding portions 88 move the logging device 64 to the upper part of the tree 99.

Figure 9D:
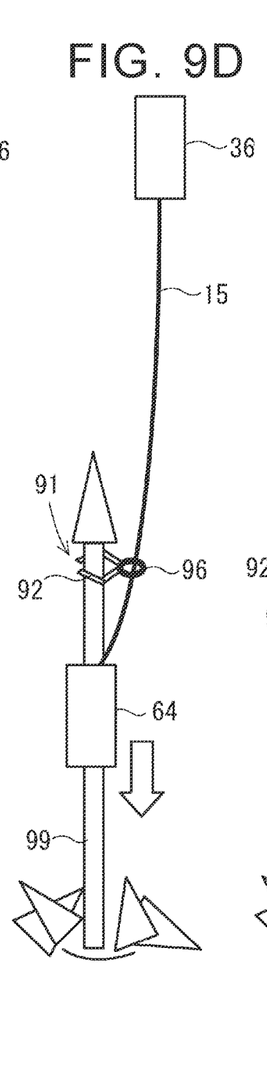
FIG. 9D is a view showing the flow of limbing and logging performed by the logging device.
Figure 9E:
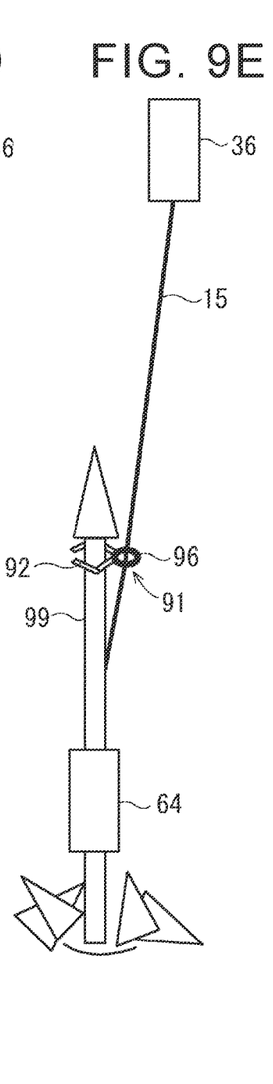
FIG. 9E is a view showing the flow of limbing and logging performed by the logging device.

In FIG. 9D, the feeding portions 88 are driven so as to move the logging device 64 downward. In FIG. 9E, the logging device 64 is located on the lower part of the tree 99, and the gripping portion 80 is brought into a strong gripping state. In this condition, the cutting portion 86 is driven so as to cut the tree 99. At this time, the tree 99 is supported at two locations with the fixed member 91 and the logging device 64.

Figure 10A:
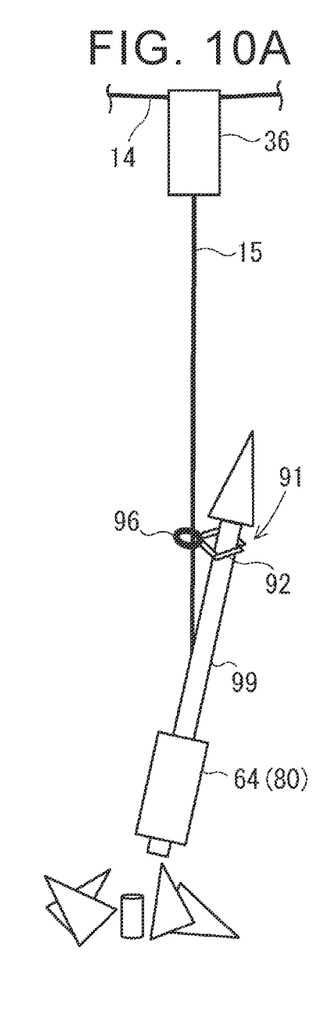
FIG. 10A is a view showing the flow of operation to convey the tree in a condition where the tree is gripped by the logging device.

FIG. 10A to FIG. 10D show the flow of operation to convey the tree 99 in a condition where it is gripped with the logging device 64. In FIG. 10A, the tree 99 is supported at two locations by the fixed member 91 and the gripping portion 80; therefore, the tree 99 does not fall over even if it is cut off. Generally, the tree 99 need be felled to fall in a preset direction, according to the positional relationship with adjacent trees; however, in this embodiment, the tree 99 is supported by the fixed member 91 and the gripping portion 80, and thus need not be cut down in the preset direction. Thus, the falling direction need not be determined, and the direction in which the gripping portion 80 grips the tree 99 need not be determined. Also, a load applied to the operation cables 14 can be significantly reduced, as compared with the case where the tree 99 is cut down. Also, the tree 99 is less likely or unlikely to be damaged due to collision against other trees. Also, it is unnecessary to fell other trees located in the falling direction in advance.

Figure 10B:
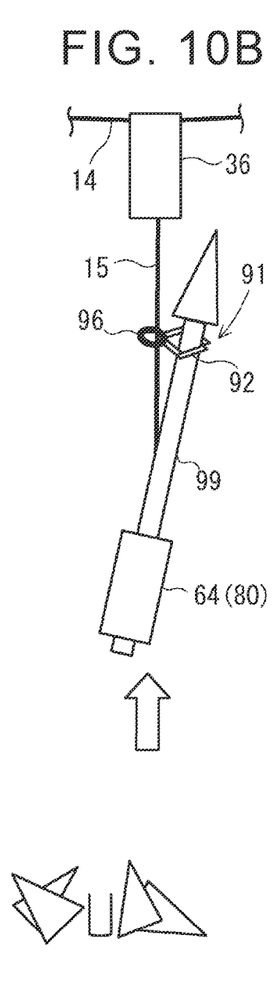
FIG. 10B is a view showing the flow of operation to convey the tree in the condition where the tree is gripped by the logging device.
Figure 10C:
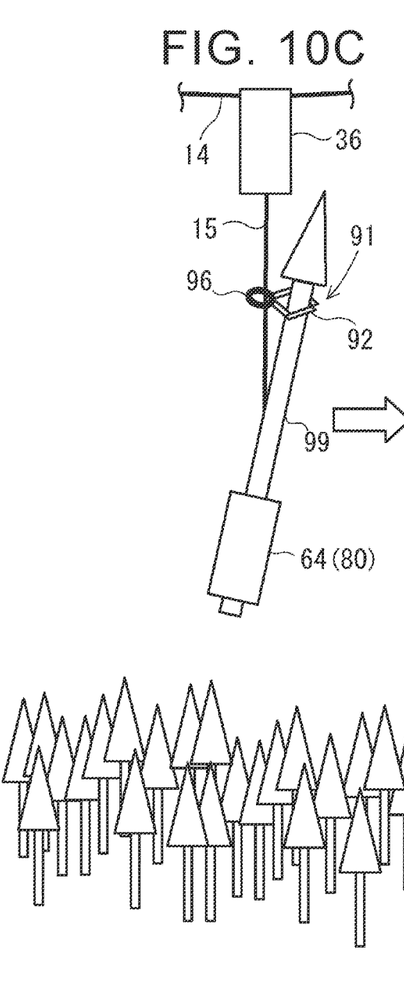
FIG. 10C is a view showing the flow of operation to convey the tree in the condition where the tree is gripped by the logging device.

In FIG. 10B, the lifting and lowering device 36 winds the hoisting wire 15, so as to lift the tree 99 gripped by the gripping portion 80 up in the air. In FIG. 10C, the winding device 34 winds the operation cables 14, so as to convey the cut tree 99 above the forest.

Figure 10D:
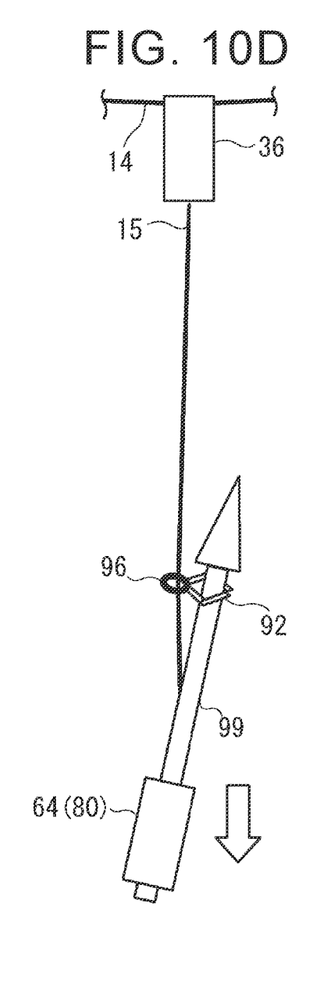
FIG. 10D is a view showing the flow of operation to convey the tree in the condition where the tree is gripped by the logging device.

In FIG. 10D, when the tree 99 is conveyed to a given point, the lifting and lowering device 36 unwinds the hoisting wire 15, so as to lower the tree 99 along with the gripping portion 80. Then, the gripping portion 80 is released from the gripping state, and the fixed member 91 is detached from the tree 99, so that conveyance of the tree 99 is completed. As shown in FIG. 8A to FIG. 8D, FIG. 9A to FIG. 9D, and FIG. 10A to FIG. 10D, it is possible to fell and convey the tree 99, without requiring the operator to go to the location of the tree 99, resulting in reduction of the burden on the operator.

Figure 11:
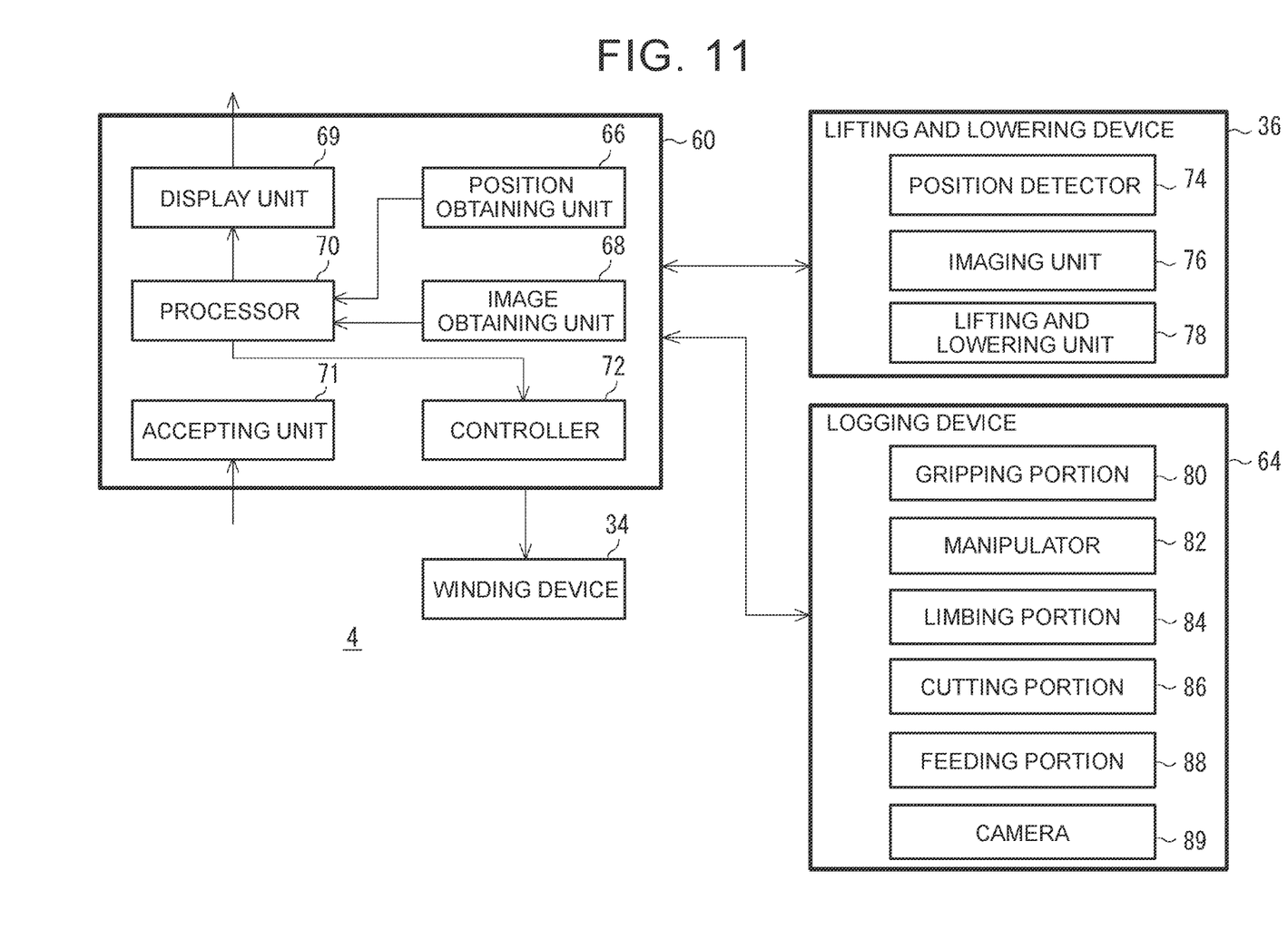
FIG. 11 is a view showing the functional configuration of a conveying system.

FIG. 11 shows the functional configuration of the conveying system 4. The conveying system 4 includes a plurality of support posts 10, wires of main cables 12 and operation cables 14, winding device 34, lifting and lowering device 36, control device 60, and logging device 64. The lifting and lowering device 36 has a position detector 74, imaging unit 76, and lifting and lowering unit 78. The control device 60 has a position obtaining unit 66, image obtaining unit 68, display unit 69, processor 70, accepting unit 71 and controller 72. The control device 60 is wirelessly connected to the winding device 34, lifting and lowering device 36, and logging device 64.

The position detector 74 of the lifting and lowering device 36 sends position information of the lifting and lowering device 36 to the position obtaining unit 66. The imaging unit 76 captures images below the lifting and lowering device 36, captures images of the tree 99 and the logging device 64, and sends the captured images to the image obtaining unit 68. The lifting and lowering unit 78 winds and unwinds the hoisting wire 15, so as to move the logging device 64 up and down.

The position obtaining unit 66 of the control device 60 obtains the position information of the lifting and lowering device 36, and sends it to the processor 70. The image obtaining unit 68 obtains the images captured by the imaging unit 76, and sends them to the processor 70. Also, the image obtaining unit 68 obtains images captured by the camera 89 of the logging device 64, from the camera 89, and sends them to the processor 70.

The accepting unit 71 accepts entry of the operator. For example, the operator controls movement of the arm portion 90 of the manipulator 82 and gripping motion of the hook portion 92. Also, the operator can adjust the position of the logging device 64 by operating the winding device 34 and the lifting and lowering device 36.

The processor 70 sends the images captured by the imaging unit 76 and the images captured by the camera 89 to the display unit 69, and causes the display unit 69 to display the images. The operator can operate the logging device 64 and the winding device 34, based on the images transmitted from the lifting and lowering device 36, and the images transmitted from the logging device 64, which are displayed on the display unit 69.

The processor 70 makes a decision to proceed with each of the operation processes shown in FIG. 8A to FIG. 8D, FIG. 9A to FIG. 9D, and FIG. 10A to FIG. 10D, based on the position information of the lifting and lowering device 36, images captured by the imaging unit 76, images captured by the camera 89 of the logging device 64, and so forth. The controller 72 controls the winding device 34, lifting and lowering device 36, and logging device 64, so as to carry out the operation process determined by the processor 70.

The processor 70 determines execution of the process step of moving the lifting and lowering device 36 and the logging device 64 to a point above the tree 99 scheduled to be felled, based on the position information of the lifting and lowering device 36 and the images captured by the imaging unit 76. The processor 70 obtains the position information of the tree 99 set in advance, and determines movement of the lifting and lowering device 36. The controller 72 drives the winding device 34, and moves the lifting and lowering device 36 and the logging device 64.

Processing performed in the conveying system 4 includes processing automatically performed by the control device 60, and processing performed through operation of the operator. For example, the operator may perform operation to grip the tree 99 with the gripping portion 80 as shown in FIG. 8B to FIG. 8D, and the control device 60 may automatically perform other operations.

The processor 70 determines execution of the limbing step shown in FIG. 9A and FIG. 9B when the gripping portion 80 grips the tree 99. The controller 72 drives the feeding portions 88, so as to move the logging device 64 upward.

Then, the processor 70 determines execution of the process step of fixing the hook portion 92 to the upper part of the tree 99 with the manipulator 82, as shown in FIG. 9C. The controller 72 drives the arm portion 90 and the hook portion 92, to cause these portions 90, 92 to seize the upper part of the tree 99, and detaches the detachable portion 94 from the arm portion 90. As a result, the fixed member 91 through which the hoisting wire 15 is inserted is fixed to the upper part of the tree 99. Meanwhile, the operator may control this operation.

Then, the processor 70 determines execution of the process step of cutting the lower part of the tree 99 as shown in FIG. 9D and FIG. 9E. The controller 72 drives the feeding portions 88 so as to move the logging device 64 to the lower part of the tree 99, and drives the cutting portion 86 so as to cut off the lower part of the tree 99.

Then, the processor 70 determines execution of the operation process to convey the tree 99 as shown in FIG. 10A to FIG. 10D. The controller 72 drives the lifting and lowering unit 78, to lift the logging device 64 and the tree 99 up in the air, and drives the winding device 34, so as to convey the tree 99 to a given position. Then, the controller 72 drives the lifting and lowering unit 78 to lower the tree 99, and drives the gripping portion 80 to release gripping.

In the above manner, the conveying system 4 can carry out logging and conveyance of the tree 99, while reducing the burden on the operator who would otherwise move to the location of the tree 99. Also, the conveying system 4 can prevent the tree 99 from falling down when it is felled, since the tree 99 is supported at two locations by the fixed member 91 and the logging device 64 when it is cut off.

Animal Damage Control System

The cable use system 1 can be used as an animal damage control system that protects trees against harmful animals. In the animal damage control system, a sound-wave generation device that repels harmful animals is installed, in place of the detecting device 32 shown in FIG. 2. The sound-wave generation device has a speaker that generates ultrasonic wave, a buzzer that gives an alarm, and a camera. When the control device analyzes an image captured by the camera, and detects a harmful animal in the image, the sound-wave generation device is moved close to the harmful animal, and the speaker and buzzer are activated, so as to repel the harmful animal.

Thus, the cable use system 1 can implement a plurality of functions, in addition to collection of trees, by replacing the device hung from the lifting and lowering device 36 with other devices. Consequently, convenience of the cable use system 1 is improved, and the support posts 10 and cables can be effectively utilized. A mounting part for replacement of each device is provided at a lower end of the hoisting wire 15, and each device can be attached to or detached from the mounting part.

The disclosure has been described based on the embodiments. It is to be understood by those skilled in the art that the embodiments are merely exemplary, that the embodiments may have modified examples having various combinations of constituent elements and operation processes, and that these modified examples are also within the scope of the disclosure.

While the detecting device 32 is provided with the position detector 56 in the illustrated embodiment, the disclosure is not limited to this arrangement, but the lifting and lowering device 36 may be provided with a position detector.

While the fixed member 91 is fixed to the tree 99 such that the tree 99 is seized by the hook portion 92 in the illustrated embodiment, the disclosure is not limited to this arrangement. For example, the hook portion 92 may be replaced with a wedge member driven into the tree 99. Also, the wedge member of the modified example may be provided on the logging device 64, separately from the manipulator 82. In any case, the fixed member 91 is fixed to the tree 99, and the hoisting wire 15 is inserted through the ring portion 96.

What is claimed is:

1. A detection system comprising:
   a plurality of support posts;
   a cable supported by the support posts;
   a winding device operable to wind the cable;
   a lifting and lowering device that is connected to the cable, and is movable in an air when the cable is wound by the winding device; and
   a detecting device hung by the lifting and lowering device, wherein
   the detecting device is configured to be moved by the winding device in a region defined by the support posts, and configured to be lowered by the lifting and lowering device to detect information concerning an object.

2. The detection system according to claim 1, wherein the detecting device is lowered by the lifting and lowering device and detects information concerning a root side of a tree in a forest.

3. The detection system according to claim 2, further comprising a processing device configured to analyze data obtained by detecting, from the air, a plurality of trees present in the region defined by the support posts, and determine a position among the trees, as a detection point at which the detecting device is lowered.

4. A detecting method comprising:
   a first step of moving a lifting and lowering device to a point above a detection point, by winding a cable by a winding device operable to wind the cable supported by support posts, the lifting and lowering device being connected to the cable and being movable in an air when the cable being wound by the winding device;
   a second step of lowering a detecting device by the lifting and lowering device, the detecting device being hung by the lifting and lowering device;
   a third step of detecting information concerning an object, by the detecting device; and
   a fourth step of lifting the detecting device by the lifting and lowering device, wherein
   the first step through the fourth step are repeated at another detection point.

* * * * *